Sept. 24, 1963  C. B. SANBORN, JR  3,105,181
LIMIT CONTROL FOR MOTORS
Filed Dec. 30, 1959
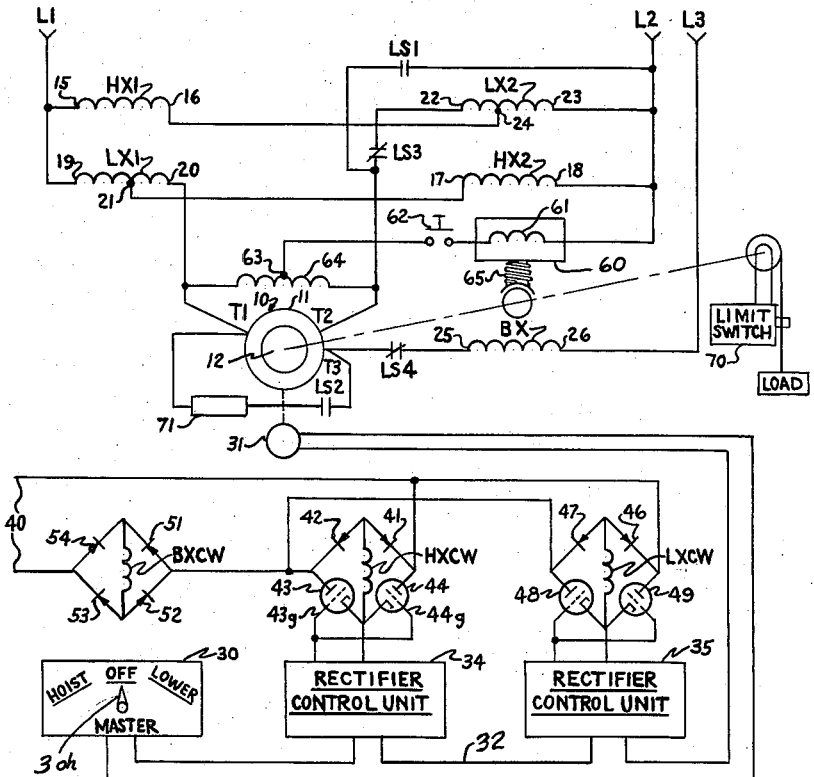
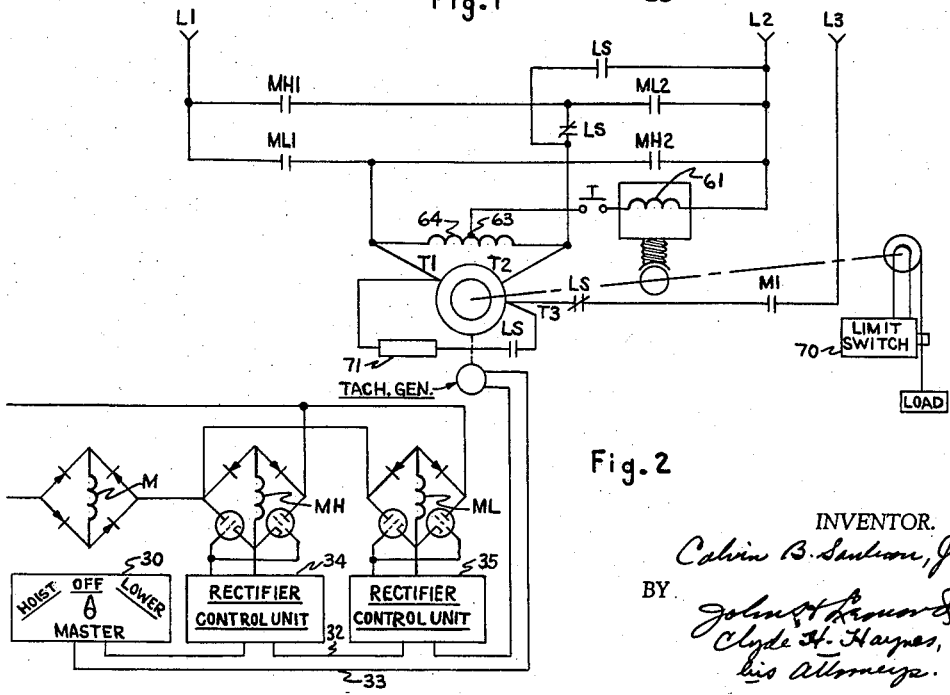
INVENTOR.
Calvin B. Sanborn, Jr.,
BY
John H. Leonard &
Clyde H. Haynes,
his Attorneys.

— # United States Patent Office 3,105,181
Patented Sept. 24, 1963

3,105,181
LIMIT CONTROL FOR MOTORS
Calvin B. Sanborn, Jr., Bedford, Ohio, assignor to Square D Company, Detroit, Mich., a corporation of Michigan
Filed Dec. 30, 1959, Ser. No. 863,020
7 Claims. (Cl. 318—203)

This invention relates to a control system for controlling the mode of operation of a motor which system includes a limit control system responsive to operation of the motor beyond a predetermined limit of operation, and for controlling accelerating and decelerating movements of a load, particularly in a motor and load combination.

In many instances, it is necessary to provide limit switches which will automatically discontinue energization of a motor and thus stop movement of a load beyond a certain point. Generally, it is necessary to provide a control circuit which, after the limit switch has been opened, will permit movement of the load out of the limit switch, or continue operation of the motor in a direction opposite to that in which it moved the load into the limit switch. An example of such an instance is found in hoist circuits wherein the limit switch is used to prevent overhoisting of the load into the hoist blocks or crane supporting structure. Limit switches have long been used for this purpose on cranes employing direct current motors or alternating current motors.

One of the problems involved is to provide a hoist circuit with a limit switch which will stop the motor when it hoists into the limit switch and at the same time will permit safe lowering out of the limit switch without any danger of overspeeding the motor or dropping the load. It is also advisable to provide a circuit which will permit driving down torques in case an empty hook is hoisted into the limit switch, because, in such cases, there would be no load on the hook to tend to drive the motor in a downward direction.

Another problem is that of being able to drive a load downwardly by energizing the motor for the downward direction of rotation and controlling the speed of that downward movement even in those cases wherein the limit switch will not return to its normal position after it has been tripped and after the load has been again moved out of contact with the switch.

One of the objects of the present invention is to overcome the aforementioned deficiencies and problems encountered in the prior circuits.

Another object of the present invention is to provide a system for controlling acceleration and deceleration of an overhauling load in such a manner that the load is repeatedly caused to accelerate and then decelerate in a controlled sequence of movement depending on the speed of movement of the load while the load is moving only in one direction.

Another object of the invention is to provide a limit means in the control system of an electric motor to effect de-energization of the motor when it reaches a certain limit of operation and to permit energization of the motor for an opposite direction of rotation.

A further object of the invention is to provide a control system for controlling the mode of operation of a multi-phase motor by controlling the energization of each of the field windings of the motor by multi-phase power and in which first means are operative to effect energization of each of the field windings by its respective phase of the source of power to cause the motor to operate in a first mode of operation, and in which limit control means are responsive to operation of the motor beyond a certain limit of operation in that first mode of operation to effect de-energization of at least one of the field windings and to form a closed loop consisting of a current conductor means and at least another one of the field windings, and in which second means are operative while the limit switch is tripped to effect energization of at least one of the field windings by a phase of the source of power to cause the motor to operate in a mode of operation different from the first mode of operation.

Another object of the invention is to set a friction brake when the limit switch operates.

Other objects and a fuller understanding of the present invention may be had by referring to the appended claims defining the present new, novel and useful invention or discovery, to the following description of a specific means or method contemplated by the inventor for carrying out his invention, and to the accompanying drawings in which:

FIGURE 1 is a schematic diagram of a system incorporating the invention; and

FIGURE 2 is a modification of the invention showing the adaptability of the limit switch with forward and reversing contactors in place of forward and reversing reactors.

The following description of the attached drawings and the accompanying claims jointly set forth one or more modifications incorporating the present invention and the advancement in the art of motor control circuits. As used throughout the present description and claims, the specific terms used to identify the parts or components have been arbitrarily chosen to indicate to others commercially available parts or components which may by readily obtained to carry out the specific mode of the invention as described herein, and they are to be interpreted in their broad sense wherein they include electrically or mechanically equivalent components which will provide the same functions as those mentioned herein.

In the following description, it is understood that the present illustration is for the purpose of exemplification and is not intended in any way to limit the scope of the invention either to the specific application illustrated or to the functions obtained thereby.

The individual components in the circuit are identified in the drawings either by letters or a combination of letters and numbers. It is further noted that where convenient, the letters used as reference characters to identify a component are, to some extent, an abbreviation of the function performed by the respective component in the control system.

FIGURE 1 illustrates the control circuit for controlling the speed and direction of rotation of a three-phase induction motor 10 having a stator 11 and a rotor 12. The stator 11 is provided with terminals T1, T2 and T3, which receive power from a three-phase source of voltage and current represented by supply lines L1, L2 and L3. The stator has as many stator windings as there are phases in the source of power. Interconnected between the stator 11 and the lower lines L1, L2 and L3, are three individual and magnetically separated saturable reactor units. The reactor units are designed in accordance with well known design principles for saturable reactors which are commonly used in the industry. One of the reactor units has alternating current power windings HX1 and HX2 normally of high impedance and a direct current saturating or control winding HXCW arranged on a common magnetic core (not illustrated) so that magnetic flux established by the control winding HXCW threads both of the alternating current power windings HX1 and HX2. Another reactor unit has alternating current power windings LX1 and LX2 normally of high impedance and a direct current saturating winding LXCW, while the third reactor unit has only an alternating current power winding BX normally of high impedance, and a direct current saturating winding BXCW. It is noted that the direct current saturating windings HXCW, LXCW and BXCW are physically removed from each other so that flux generated by energization of any one of them is free from threading through any other one or more of them. The impedance of each alternating current power winding is reduced in proportion to an increase in the energization of its respective direct current saturating winding.

The alternating current power winding HX1 has end taps 15 and 16; the alternating current power winding HX2 has end taps 17 and 18; alternating current power winding LX1 has end taps 19 and 20 and an intermediate tap 21; and, the alternating current power winding LX2 has end taps 22 and 23 and an intermediate tap 24. End taps 15 and 19 of alternating current power windings HX1 and LX1, respectively, are interconnected to the power line L1 and the end taps 18 and 23 of the alternating current power windings HX2 and LX2, respectively, are interconnected to the power line L2. The end tap 16 of alternating current power winding HX1 is connected to the intermediate tap 24 of the alternating current power winding LX2 and the end tap 17 of the alternating current power winding HX2 is connected to the intermediate tap 21 of the alternating current power winding LX1. The end tap 20 is connected to the terminal T1 and the end tap 22 is connected to the terminal T2. The alternating current power winding BX has one end tap 25 connected to the terminal T3 and another end tap 26 connected to the power line L3.

As also described in a co-pending application Serial No. 862,842 entitled Motor Control and filed of even date herewith, now U.S. Letters Patent 3,076,126, issued January 29, 1963, energization of the direct current saturating windings HXCW, LXCW and BXCW is in accordance with the algebraic sum and combination of a command signal and a feed back signal. The command signal is from a master 30 which defines a source of the command signal, and the feed back signal is derived from a feed back signal source, such as a speed responsive means which may be in the form of a direct current tachometer generator 31 driven by the motor 10.

The command signal from the master 30 and the feed back signal from the tachometer generator 31 in this instance are both direct current voltage signals and therefore are easily combined by connecting the output terminals of the master 30 and the tachometer generator 31 in series electrical circuit connection. Interposed in this series connection, represented by the wires 32 and 33, are rectifier control units 34 and 35 which operate as described in the aforementioned patent in accordance with the combined signal provided by the master 30 and the tachometer generator 31 to control energization of the direct current saturating windings HXCW and LXCW. Thus the rectifier control means 34 and 35 provide a means responsive to the command signal from the master 30 and the feedback signal from the tachometer 31.

The direct current saturating windings BXCW, HXCW and LXCW are energized by current from a current source 40 which in this instance provides alternating current. For example, unidirectional flow of current through the direct current saturating winding HXCW is provided by connecting it as the load across a full-wave bridge rectifier circuit including rectifiers 41 and 42 and control means such as controlled rectifiers 43 and 44. The rectifiers are connected in the bridge in such manner that any instant of time, current flows either through rectifier 43 or 44 and not through both of them simultaneously. The magnitude of current allowed to flow through the controlled rectifiers 43 and 44 is controlled by the rectifier control unit 34 by connecting the control elements 43g and 44g of controlled rectifiers 43 and 44 to the rectifier control unit 34.

Rectifier control units 34 and 35 are similar to each other and are operative in such manner that a combination signal of the master and feed back signal effects conductivity of the controlled rectifiers 43 and 44 while simultaneously preventing conductivity through the rectifiers 48 and 49, or vice versa. In this way, when the saturating winding HXCW is energized to any degree of energization, the saturating winding LXCW is completely free of saturation, or vice versa.

As further illustrated, these rectifier bridges containing the direct current saturating windings HXCW and LXCW, respectively, are connected in parallel and this parallel connection is connected in series with the direct current saturating winding BXCW. The combination series and parallel arrangement is then connected across the current source 40. Unidirectional flow of current through the direct current saturating winding BXCW is obtained by connecting it as the load in a full wave bridge rectifier containing rectifiers 51, 52, 53 and 54. It is noted that whenever current flows through either the direct current saturating winding HXCW or the direct current saturating winding LXCW, that same current flows through the direct current saturating winding BXCW so that the magnitude of current flowing through the alternating current power winding BX is controlled simultaneously with the controlling of the magnitude of current flowing through either alternating current power windings HX1 and HX2 or the magnitude of current flowing through alternating current power windings LX1 and LX2.

One of the applications of the present motor control circuit is in hoisting wherein the motor 10 is to hoist a load or to control the lowering of the load. When the motor is used in this application, movement control means which, as illustrated, is in the form of a spring set electromagnetically released brake 60 is usually applied to the driving structure, or mechanically coupled to the rotor 12 of the motor 10. FIGURE 1 illustrates such a movement controlling brake 60 as having an energizable release coil 61 connected, preferably, in series with a safety switch 62, and between the end tap 18 and an intermediate tap 63 on a voltage divider or coil 64 interconnected between the terminals T1 and T2. Brakes of this type are commonly used in the industry and have a spring 65 which normally sets the brake to prevent rotation of the rotor 12. Energization of the coil 61 overcomes the spring 65 to permit rotation of the rotor. With this circuit arrangement, the energizable release coil 61 is energized whenever the switch 62 is closed and power is applied to the motor terminals T1 and T2.

The magnitude of the current to these terminals, T1 and T2 or the phase voltages impressed thereon, has no effect on the magnitude of the voltage impressed across the coil 61. The voltage across the coil 61 is approximately one-half the voltage across phase L1—L2. Although the safety switch 62 has been illustrated as a push button for purposes of clarity, it is understood that it can be interlocked with the operating handle 30h of the master 30 in any manner commonly used in the art. When the safety switch 62 is used, it must be held down and closed to permit energization of coil 61 and release of the brake to operate the hoist by moving operating handle 30h in any of its hoist and lower positions wherein the master 30 provides the desired hoist or lower command signal.

FIGURE 1 further illustrates the feature of using a limit switch 70, operable by hoisting of a load into the limit switch, to prevent continued hoisting of the load and continued operation of the motor in the hoisting direction regardless of the command signal being given by the master 30. Limit switch 70 is of any well-known design commonly used in the industry and includes normally open contacts LS1 and LS2 and normally closed contacts LS3 and LS4. The switch 70 is operative in such manner that when the load engages it, the normally open contacts LS1 and LS2 are closed and the normally closed contacts LS3 and LS4 are opened. The normally open contact LS1 is interconnected directly between the supply line L2 and the terminal T2 so that it shunts the alternating current power winding LX2. The normally open contact LS2 is interconnected in series with a current conductor means 71 between the terminals T3 and T1. The normally closed contact LS3 is interconnected in series with the alternating current power winding LX2 and in shunt with contact LS1. The normally closed contact LS4 is interconnected in series with the alternating current power winding BX and the terminal T3. The current conductor means 71 may be physically constructed in the form of a resistor, capacitor, reactor means, either singly or in combination, all of which are considered electrically conductive devices which will conduct current and at the same time do not necessarily form a short circuit between the terminals T1 and T3.

Operation

With the initial movement of the master and particularly handle 30h in the hoist direction, the master switch produces a direct current command signal which is fed into the rectifier control unit 34 and the rectifier control unit 35. This direct current signal turns on the hoist rectifier control unit 34 and leaves off the rectifier control unit 35. The turning on of the hoist rectifier control unit 34 causes the controlled rectifiers 43 and 44 in the rectifier bridge circuit to supply direct current to the direct current saturating winding HXCW. At this time, no current flows through direct current saturating winding LXCW or through power windings LX1 and LX2 because rectifier control unit 35 has not been turned on. The tachometer generator 31 produces no feed back signal because the hoist has not started to move.

Current is now conducted from the alternating current supply 40 through the bridge rectifier energizing the direct current saturating winding HXCW and the bridge rectifier energizing the direct current saturating winding BXCW. The direct current flowing through direct current saturating windings HXCW and BXCW partially saturates the respective saturable reactor units, reducing the impedance of the respective alternating current windings HX1, HX2 and BX. With the saturation or lowering of the impedance of alternating current windings HX1, HX2 and BX, the potential at the terminal T1 approaches the potential at the supply line L2, the potential at the terminal T2 approaches the potential at supply line L1, the potential at the terminal T3 approaches the potential at the supply line L3. When the impedances of alternating current power windings HX1, HX2 and BX approach zero, the terminals T1, T2 and T3 are at substantially the same potential as the line terminals L1, L2, and L3, respectively. Adjustment of the impedance of the alternating current windings adjusts the voltage at the terminals T1, T2 and T3 and thereby the speed of the motor in the hoist direction.

As shown in FIGURES 1 and 2, the end tap 16 of the alternating current power winding HX1 is fastened to the intermediate tap 24 of the alternating current power winding LX2 and the end tap 17 of the alternating current power winding HX2 is fastened to the intermediate tap 21 of the alternating current power winding LX1. Because of this, the alternating current power windings LX1 and LX2 operate as an autotransformer to produce a voltage in their overhanging sections, i.e. between the intermediate tap 21 and the end tap 20 and the end tap 22 and the intermediate tap 24 respectively. The voltage in the overhanging winding between the end tap 20 and the intermediate tap 21 of alternating current power winding LX1 is in the same direction as the voltage in alternating current power winding HX1 at any instant of time. The voltage in the overhanging winding between the end tap 22 and the intermediate tap 24 of the alternating current power winding LX2 is in the same direction as the voltages in the alternating current power winding HX2 at any instant of time. The voltage added by the overhangs replaces voltage drop across the alternating current power windings HX1 or HX2 due to impedance inherent in the windings which cannot be overcome by the winding HXCW. In this way, the terminal voltages may be made substantially equal to the line voltages during hoisting and when the master is commanding full speed hoist. The terminals T1, T2 and T3 may be considered to have balanced voltages applied thereto, even though the voltage loss in the alternating current power winding BX has not been compensated for.

When the load starts to move in the hoist direction, the tachometer generator 31, which is mechanically coupled to the motor shaft, starts to produce a feed back voltage signal which is proportional to the speed of the motor 10. This feed back signal from the tachometer generator 31 opposes the direct current output voltage signal from the master switch 30, and the combination controls the hoist and lower rectifier control units 34 and 35. Since the motor is moving in the hoist direction, these command and feed back signals will keep the lower rectifier control unit 35 effectively turned off. At the same time, the hoist rectifier control unit 34 output is reduced to a point at which the current flowing through the direct current saturating winding HXCW causes the voltage applied to the motor terminals to establish a motor torque sufficient to hoist the load at the speed determined by the master switch 30. The speed of the motor stabilizes when the signals from the master switch 30 and the tachometer generator 31 effectively combine to indicate to the rectifier control units that the motor is operating at the desired speed and in the desired direction.

The hoist is now lifting the load at the speed selected by the setting of the master 30. Adjusting the master 30, but keeping it in the hoist range, will cause the motor to run at any one of an infinite number of stable hoisting speeds. The motor operates at the various speeds because the various phase voltages applied to the motor may be varied from zero to the line phase voltages L1, L2 and L3. With the line phase voltages all applied to the terminals, the motor will run at a maximum obtainable speed in accordance with the weight of the load. Light loads can be lifted at a faster maximum speed than heavy loads.

If the load is hoisted into the limit switch 70, the limit switch operates to close normally open contacts LS1 and LS2 and open normally closed contacts LS3 and LS4. Closing the normally open contacts LS1 connects the terminal T2 directly to supply line L2, and closing the normally open contacts LS2 connects the current conductor means 71 across the terminals T1 and T3. Simultaneously, the normally closed contacts LS3 open to prevent any possible current flow through the alternating current power winding HX1 and at least a portion of the alternating current power winding LX2 between supply line L1 and the terminal T2 and also to prevent current flow through the alternating current power winding HX1 and a portion of alternating current power winding LX2 and the normally open contacts LS1 between supply lines L1 and L2. Normally closed contacts LS4 open to effectively disconnect terminal T3 from the supply line L3. At this time, and even though master 30 may still be providing a hoist command signal, the motor is effectively de-energized and the brake 60 will set. The motor is effectively de-energized because the terminal T3 is disconnected from the supply line L3 and the terminal T1 is effectively disconnected from the supply line L1 due to the impedance of the alternating current power winding LX1. The brake 60 will set for lack of voltage drop across voltage divider 64 and between the intermediate tap 63 of the voltage divider 64 and the supply line L2.

If the master 30 is now returned to the off position so as not to provide a command signal, the brake will remain set and the motor will be de-energized the same as the normal operation when the load has not tripped the limit switch.

If the master 30 is operated to provide a lower command signal which directs operation of the motor in a lowering direction, rectifier control units 34 and 35 will cause energization of the direct current saturating winding LXCW, but not of the direct current saturating winding HXCW, thereby reducing the impedance of the alternating current power winding LX1 and causing the alternating current power winding HX1 to be a high impedance. This affects energization of at least one of the windings of the stator 11 because current can now flow in a standby circuit through the now closed limit switch contacts LS1 and the now saturated reactor LX1, between supply lines L1 and L2 to terminal T1 and terminal T2. In addition, a voltage drop again appears across voltage divider 64 with a result that coil 61 is energized and the brake releases, providing the switch 62 is closed. With the brake released and the voltage applied to motor terminals T1 and T2, or at least one phase of the stator windings, and with terminals T1 and T3 of the motor shunted by current conductor means 71, the motor will rotate in the downward direction and the load will move downwardly and away from the limit switch 70. It is noted that the current flowing in the current conductor means 71 and between terminals T1 and T3 is out of phase with the current flowing through terminal T1 and T2 from the power lines L1 and L2. This causes a downward torque on the rotor 12. After the load has moved out of the limit switch 60, the contacts LS1 and LS2 again are open and LS3 and LS4 are again closed so that the circuit is returned for normal operation. However, if the limit switch fails to reset itself and if the load is sufficiently large to become overhauling in which case it overcomes all the frictions in the motor and driving units and actually drives the motor in a lowering direction, the rectifier control units respond to the combination of the command and feed back signals to control that downward movement. In effect, the lower command signal from the master 30 causes the brake to be released, assuming switch 62 is closed, and the motor 10 to run or be driven in the lowering direction by the load until the tachometer generator 31 has accelerated to a speed when its feed back signal overcomes the lower command signal. At the instant the feed back signal overcomes the command signal and because the command and feed back signals are of opposing polarity, rectifier control unit 35 responds to the two signals to completely de-energize LXCW and simultaneously rectifier control unit 34 energizes HXCW. De-energizing the direct current saturating winding LXCW removes energizing power from the motor, and energizing the direct current saturating winding HXCW has no effect on the energization of the motor. During this transition period, it is noted that there is a loss of voltage in the voltage divider 64 and a resultant setting of the brake 60 thereby decelerating and stopping movement of the load.

As soon as the load has stopped moving and the command signal has again overcome the feed back signal, the direct current saturating winding LXCW is again energized and the complete cycle starts over. The cycle of alternate acceleration and deceleration continues to repeat itself until the load has come to a safe resting position on some supporting structure. Thus the motor and its control regulate the downward movement of the load, even when the limit switch fails to reset.

The limit switch arrangement as used in FIGURE 1 may also be used in connection with an electromagnetic device, such as the reversing contactors in FIG. 2, as well as with the reversing reactors of FIGURE 1. FIGURE 2 illustrates a circuit wherein the limit switch is applied in connection with reversing contactors. In FIGURE 2, the reactor windings HX1 and HX2 have been replaced by normally open sets of contacts MH1 and MH2 and the winding HXCW has been replaced by a contactor coil MH which is operative when energized to close the sets of contacts MH1 and MH2. The reactor windings LX1 and LX2 have been replaced by normally open sets of contacts ML1 and ML2 and the winding LXCW has been replaced by a contactor coil ML which is operative when energized to close the sets of contacts ML1 and ML2. The reactor winding BX has been replaced by normally open set of contacts ML and the winding BXCW has been replaced by a contactor coil M which is operative when energized to close the set of contacts M1. The operation of the limit switches, the master, the tachometer generator and the rectifier control unit is the same as in FIGURE 1. Therefore, the operation of the circuit of FIGURE 2 is similar to that of FIGURE 1 insofar as the limit switches are concerned. However, it is noted that energization of the motor for a particular direction of rotation is either at full line voltage or at zero voltage whereas in the circuit of FIGURE 1, the motor may be variably energized depending on the magnitude of the command and feed back signals.

The control circuitry described provides regulator means. It is apparent from the foregoing that when the load is an overhauling load, the motor and the control circuitry provide the regulator means. On the other hand, when the motor itself is the prime mover, it and the control circuitry provide the regulator means. Thus, in the latter case, the motor performs both the function of a prime mover and also a function of a part of the regulator means.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A control system for controlling the mode of operation of a multi-phase motor by controlling the energization, from a multi-phase source of power, of each of the windings of the motor, and comprising first means operative to effect energization of the motor windings by the source of power to cause the motor to operate in a first mode of operation, current conductor means, limit control means responsive to operation of said motor beyond a certain limit of operation in said first mode of operation to discontinue the energization of said motor windings by said source of power and to form a closed loop including said current conductor means and at least one of said motor windings, a standby circuit, said limit control means also being operable concurrently with discontinuance of energization of the motor windings to connect a motor winding extraneous of the closed loop for subsequent energization by said standby circuit, and second means operative while said limit control means is tripped to close said standby circuit, thereby to reverse energization of the motor windings to cause said motor to operate in a different mode of operation.

2. The structure as defined in claim 1 wherein said current conductor means includes a current resistor.

3. The structure as defined in claim 1 wherein said current conductor means includes a capacitor.

4. The structure according to claim 1 wherein the motor is a three-phase motor.

5. A control system for controlling the mode of operation of a multiphase motor by controlling the energization of the terminals of the motor by line terminals, respectively, of a multiphase source of power, and comprising current conductor means in an open loop circuit with two of said motor terminals, an energizable device associated with the motor and operative when free of energization to affect the mode of operation of the motor and operative when energized to be free from affecting said mode of operation, first means operative in one condition to effect energization of the motor terminals by the source of power and to energize said device and motor to cause the motor to operate in a first mode of operation and operative in another condition to effect deenergization of said motor terminals and device to cause said motor to operate in a second mode of operation, limit control means responsive to the operation of said motor beyond a certain limit of operation in said first mode of operation and while said first means are in said one condition to discontinue the energization of said motor terminals including said two motor terminals by their respective line terminals and close said loop, and to effect deenergization of said energizable device to cause the motor to operate in said second mode of operation, a standby circuit, said limit control means also being operable concurrently to electrically connect one of the motor terminals other than said two terminals for subsequent energization by said standby circuit, and second means operative while said limit control means is tripped and said first means is in said another condition to close said standby circuit, thereby to effect reverse energization of the motor terminals to cause said motor to operate in a third mode of operation different from said first and second modes of operation.

6. A control for controlling rotation of the rotor of a three-phase motor by controlling the energization of the stator terminals of the motor from line terminals, respectively, of a three-phase source of power and comprising a resistor, a brake associated with the motor and having a spring operative to arrest rotation of the rotor and having a brake releasing coil energizable to overcome the spring to permit rotation of the rotor, first means operative in one condition to effect energization of each of the stator terminals by the line terminals and to energize the brake releasing coil to permit the rotor to rotate in a first direction and operative in another condition to effect deenergization of each of said stator terminals, and concurrently to deenergize said brake releasing coil, limit switch means operative in a tripped condition, only while said first means is in said one condition and by rotation of the rotor beyond a certain limit of rotation in said first direction, to discontinue energization of said stator terminals to connect said resistor to shunt with two of said stator terminals, and to effect deenergization of said brake releasing coil to cause the spring to arrest rotation of the rotor, a standby circuit, said limit switch means also being operable concurrently to electrically connect one of the stator terminals other than said two stator terminals for subsequent energization by said standby circuit, and second means operative while said limit switch means is in said tripped condition and when said first means is in said another condition to close the standby circuit thereby to effect reverse energization of all of said stator terminals to cause said rotor to rotate in a direction opposite said first direction.

7. In a hoist and control system in which the hoist is subject to overhauling loads, a load support, a motor drivingly connected to the support for lifting and lowering the support, hoist voltage adjuster means connected to the motor for controlling the magnitude of voltage applied to the motor for operating the motor in the hoisting direction when the hoist voltage adjuster means are connected to a source of power, lowering voltage adjuster means connected to the motor for controlling the magnitude of voltage applied to the motor for operation of the motor in the lowering direction when the lowering voltage adjuster means are connected to said source of power, regulator means responsive to the speed of movement of the support for controlling both of said voltage adjuster means, a spring applied electromagnetically released brake energizable by said source of power concurrently with energization, by each voltage adjuster means, of the motor, limit control means adapted to be tripped by hoisting of the load support by the motor beyond a predetermined limit and normally connecting the motor and brake to both voltage adjuster means, and operative when tripped to render the motor and brake unenergizable through the voltage adjuster means, a bypass circuit operative when closed for rendering the motor and brake energizable through the lowering voltage adjuster means while rendering the hoisting voltage adjuster means inoperative to energize the motor and brake, and means operated by the limit control means, when the limit control means is tripped, for closing the bypass circuit, whereby if the limit control means is not reset, the brake is applied and released in response to the speed responsive means during lowering of an overhauling load.

References Cited in the file of this patent

UNITED STATES PATENTS

| | | |
|---|---|---|
| 2,233,501 | Wilcox | Mar. 4, 1941 |
| 2,421,431 | Pell | June 3, 1947 |
| 2,460,234 | Myles et al. | Jan. 25, 1949 |
| 2,602,912 | Landau | July 8, 1952 |
| 2,994,025 | Mitchell | July 25, 1961 |
| 3,039,036 | Wendelburg et al. | June 12, 1962 |